(12) United States Patent
Shiotani et al.

(10) Patent No.: US 7,124,974 B2
(45) Date of Patent: Oct. 24, 2006

(54) SEAT BELT RETRACTOR

(75) Inventors: Masahiro Shiotani, Koga-gun (JP); Joji Mishina, Koga-gun (JP); Yasushi Kanamori, Nagahama (JP); Isamu Mizuno, Echi-gun (JP)

(73) Assignee: Takata Corporation, Tokyo (JP)

( * ) Notice: Subject to any disclaimer, the term of this patent is extended or adjusted under 35 U.S.C. 154(b) by 161 days.

(21) Appl. No.: 09/985,924

(22) Filed: Nov. 6, 2001

(65) Prior Publication Data

US 2004/0169104 A9    Sep. 2, 2004

Related U.S. Application Data

(63) Continuation-in-part of application No. 09/513,187, filed on Feb. 25, 2000, now Pat. No. 6,419,176.

(60) Provisional application No. 60/121,917, filed on Feb. 26, 1999.

(30) Foreign Application Priority Data

Nov. 6, 2000    (JP)    ............................. 2000-337391

(51) Int. Cl.
*B65H 75/48*    (2006.01)

(52) U.S. Cl. ..................................... 242/374

(58) Field of Classification Search ................ 242/374, 242/379.1; 297/476, 477, 478; 280/806, 280/807; 384/276, 912
See application file for complete search history.

(56) References Cited

U.S. PATENT DOCUMENTS

| | | | | |
|---|---|---|---|---|
| 1,770,582 A | * | 7/1930 | Pike | ........................... 384/276 |
| 2,586,099 A | * | 2/1952 | Schultz | ........................ 384/276 |
| 4,444,010 A | | 4/1984 | Bendler | |
| 5,690,295 A | | 11/1997 | Steinberg et al. | ........... 242/374 |
| 5,794,877 A | * | 8/1998 | Ono et al. | ................ 242/379.1 |
| 5,820,058 A | | 10/1998 | Hirzel et al. | |
| 5,839,686 A | * | 11/1998 | Dybro et al. | ................ 242/374 |
| 5,881,962 A | | 3/1999 | Schmidt et al. | ............. 242/374 |
| 5,899,399 A | * | 5/1999 | Brown et al. | ................ 242/374 |
| 6,029,924 A | * | 2/2000 | Ono et al. | ................ 242/379.1 |
| 6,405,962 B1 | * | 6/2002 | Hirase | ...................... 242/379.1 |
| 6,419,176 B1 | * | 7/2002 | Mizuno | ....................... 242/374 |
| 6,446,897 B1 | * | 9/2002 | Arima et al. | ................ 242/374 |

FOREIGN PATENT DOCUMENTS

| | | |
|---|---|---|
| DE | 36 20 205 A1 | 12/1987 |
| DE | 195 12 660 | 10/1995 |
| DE | 199 09 938 | 8/2000 |
| DE | 100 08 824 | 9/2000 |
| DE | 100 08 824 A1 | 9/2000 |
| EP | 0 680 856 | 3/1995 |
| EP | 0 773 147 A2 | 5/1997 |
| GB | 2 347 124 A | 8/2000 |
| GB | 2347 124 | 8/2000 |
| JP | 2001-63519 | 3/2001 |
| JP | 2001-063520 | 3/2001 |

(Continued)

*Primary Examiner*—William A. Rivera
(74) *Attorney, Agent, or Firm*—Foley & Lardner LLP

(57) ABSTRACT

A seat belt retractor which achieves stable performance of a pretensioner. The seat belt retractor includes a spool for winding up a belt thereon. The spool has a shaft portion, a spool gear, and a spring-biased shaft projection which are disposed to project from a face of the spool. A spool bearing (or ring-like collar) is fitted around the shaft portion of the spool. The spool bearing is made of a material having high hardness and high rigidity such as SUS or SC. By this spool bearing, the spool is prevented from being directly subjected to load, like a bearing.

12 Claims, 7 Drawing Sheets

(A)

| | FOREIGN PATENT DOCUMENTS | | WO | WO 95/27638 | 10/1995 |
|---|---|---|---|---|---|
| JP | 2001-151077 | 5/2001 | WO | WO 96/25310 | 8/1996 |
| JP | 2000-163182 | 6/2001 | | | |
| JP | 2001-163182 | 6/2001 | * cited by examiner | | |

(A)

(B)

SEAT BELT RETRACTOR

This application is a continuation-in-part of application Ser. No. 09/513,187, filed Feb. 25, 2000, (now U.S. Pat. No. 6,419,176), and also claims the benefit of and priority to U.S. Provisional Patent Application Ser. No. 60/121,917, filed Feb. 26, 1999.

The present invention relates to a seat belt retractor which winds up a seat belt for restraining an occupant to a vehicle seat. More particularly, the present invention relates to a seat belt retractor which achieves more stable performance of a pretensioner.

Vehicles such as automobiles are equipped with seat belt devices for restraining rapid movement of the occupants due to acceleration occurred at a vehicle collision to ensure the safety of occupants. Such a seat belt device includes a seat belt retractor which has a spool for winding a belt thereon and a spring for retracting the belt inside the seat belt retractor and locks the withdrawal of the belt when impact is applied, thereby restraining the occupant. In recent years, most seat belt retractors for vehicles have been provided with pretensioners. The purpose of a pretensioner is to remove slack in the seat belt in the event of a collision involving the vehicle. The pretensioner operates by rapidly rotating the spool in the belt-winding direction to apply tension to the seat belt.

A seat belt retractor may include the following components: an aluminum spool for winding a belt thereon; a torsion bar fixed to the spool to extend along the axis of the spool; a pretensioner which is arranged on the other side of the base to rapidly rotate the spool in the belt-winding direction in the event of a vehicle collision; a clutch mechanism comprising a pinion fitted onto a spool gear of the spool and a ring gear within the pretensioner; and a return spring which is disposed on an outer surface of the pretensioner to bias the spool in the belt-winding direction.

The pretensioner may include the following components: a pipe; a pretensioner cover; a pretensioner plate made of steel, the cover and plate being arranged on both sides of the pipe; a gas generator fixed at the proximal end of the pipe; a piston, and a plurality of balls which are arranged inside the pipe; a guide block fitted in the other end (distal end) of the pipe.

In the seat belt retractor, the ring gear is held to the pretensioner cover by the pins before the activation of the pretensioner. In this state, the ring gear and the pinion are out of mesh and have a predetermined clearance therebetween. Therefore, the spool can freely rotate. When the gas generator is activated to generate gas, the piston and the plurality of balls within the pipe of the pretensioner are pushed by the pressure of gas. The pins are sheared by the pressing force of the balls and the holding of the ring gear is released and internal teeth of the ring gear and external teeth of the pinion are meshed together. As the external teeth of the ring gear are forced by the balls so as to rotate the ring gear, the spool is rotated via the pinion coupled with the ring gear thereby causing the belt to be pretensioned.

A shaft portion of the spool is inserted into and held by a hole of the pretensioner plate. When the ring gear and the pinion couple together, the spool is strongly pressed against the pretensioner plate due to the large impact of the ring gear and pinion. As a result, the shaft portion of the spool may be deformed because the spool is made of aluminum while the pretensioner plate is made of steel. The power of the pretensioner may be reduced due to the deformation of the shaft of the spool.

The present invention was made to solve the aforementioned problems and the object of the invention is to provide a seat belt retractor which enables to stabilize the performance of the pretensioner.

SUMMARY OF THE INVENTION

To solve the aforementioned problems, a seat belt retractor of the present invention comprises: a spool for winding up a seat belt; a clutch mechanism arranged on one end of the spool; a pretensioner disposed adjacent to the clutch mechanism; and a frame holding the spool rotatably, and is characterized in that the spool is made of light alloy, and a bearing made of steel is attached to a portion of the spool held by the frame.

According to the present invention, when great impact is applied during the clutch mechanism becomes in its coupled state, the impact is transmitted to the spool through the bearing. Therefore, the spool is prevented from being deformed, thereby further stabilizing the performance of the pretensioner.

In the seat belt retractor of the present invention, the pretensioner comprises: a gas generator; a plurality of serial driving members which will be accelerated by gas generated from the gas generator; a path for guiding the driving members; a first rotational member having a plurality of driving points (levers), wherein the driving members collide with the driving points so as to apply rotational torque to the first rotatable member; a second rotational member fixed to the spool; and a clutch mechanism defined by the first rotational member and the second rotational member, wherein the second rotational member is a pinion having external teeth; the first rotational member is a ring gear having internal teeth capable of meshed with the external teeth of the pinion and the levers around the outer periphery thereof; the clutch mechanism becomes in its coupled state where the internal teeth of the ring gear are meshed with the external teeth of the pinion by that the accelerated driving members push the levers of the ring gear so as to move the ring gear; the clutch mechanism is in its decoupled state before the activation of pretensioner and becomes in its coupled state by the rotation of the first rotational member when the pretensioner is activated (in the event of a vehicle collision).

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 6:
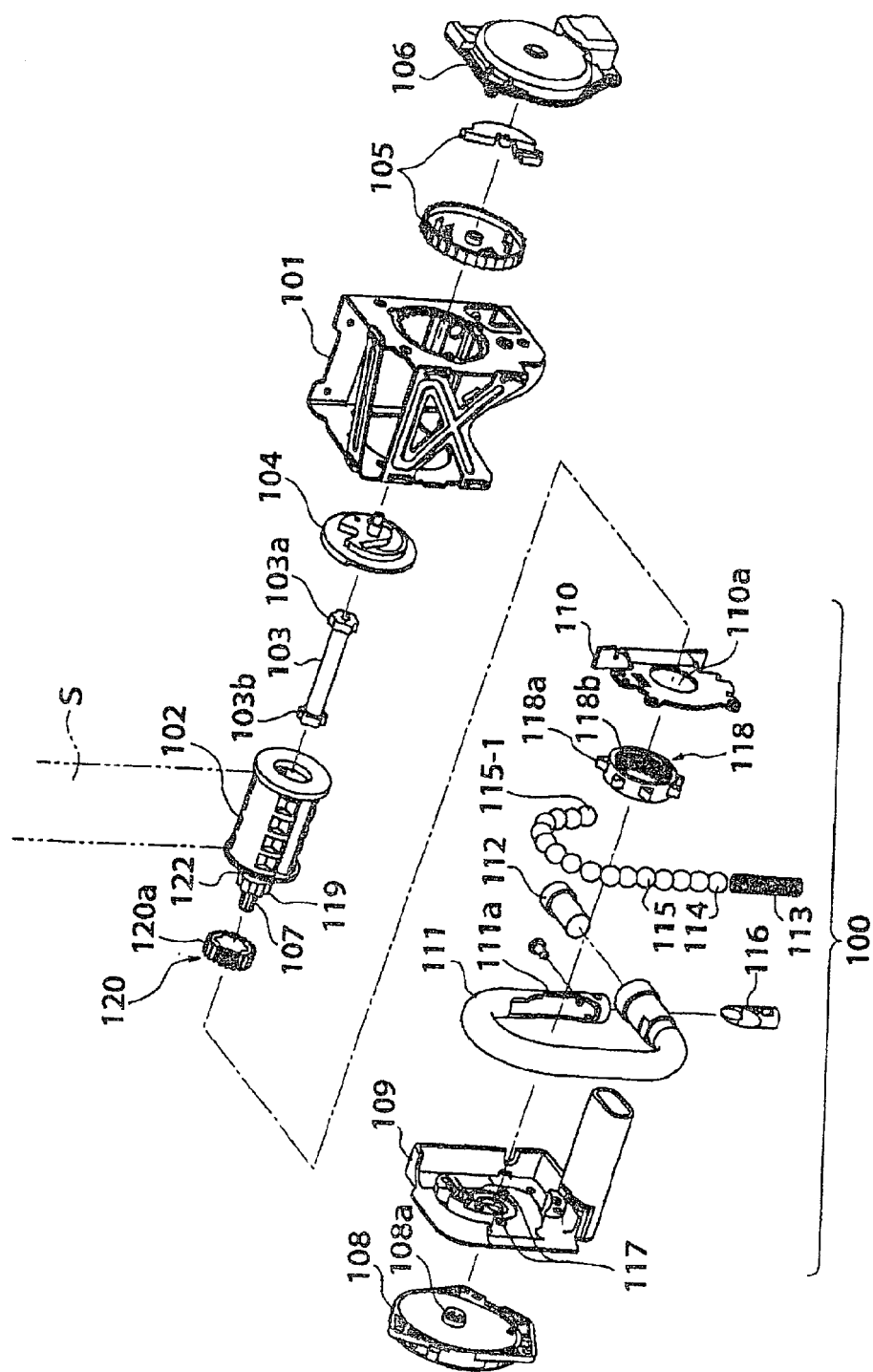
FIG. 6 is an exploded perspective view showing one example of a seat belt retractor.
Figure 7:
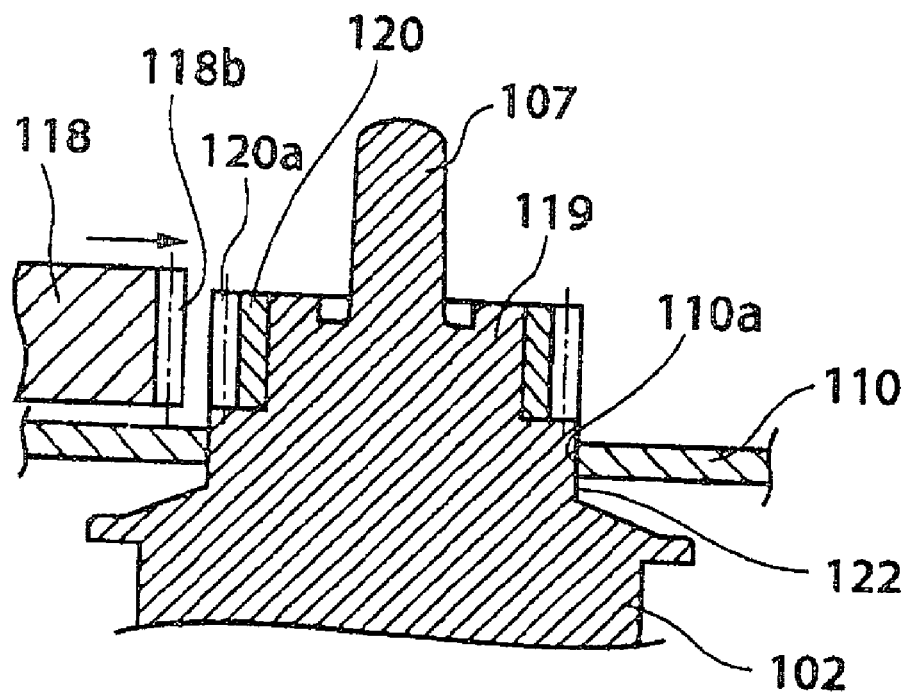
FIG. 7 is a sectional view, taken along the axis of a spool, showing a clutch mechanism portion of the seat belt retractor of FIG. 6.

FIGS. 6 and 7 disclose an example of a seat belt retractor. In these drawings, some parts are not illustrated because these are not necessary for describing the present invention.

The seat belt retractor shown in FIG. 6 comprises the following components: a base 101; a spool 102 for winding a belt S thereon which is made of aluminum; a torsion bar 103 fixed to the spool 102 to extend along the axis of the spool 102; locking mechanisms 104, 105 which are arranged on one side (the right side in FIG. 6) of the base 101 to prevent the rotation of the spool 102 in the belt withdrawing direction during the emergency locking operation; a retainer 106 for supporting one end (the right end in FIG. 6) 103a of the torsion bar 103 via the locking mechanisms 104, 105; a pretensioner 100 which is arranged on the other side (the left side in FIG. 6) of the base 101 to rapidly rotate the spool 102 in the belt-winding direction in the event of a vehicle collision; a clutch mechanism comprising a pinion 120 fitted onto a spool gear 119 of the spool 102 and a ring gear 118 within the pretensioner 100; and a return spring 108 which is disposed on an outer surface of the pretensioner 100 to bias the spool 102 in the belt-winding direction.

The pretensioner 100 comprises the following components: a pipe 111; a pretensioner cover 109 made of aluminum and a pretensioner plate 110 made of steel which are arranged on both sides of the pipe 111; a gas generator 112 fixed at the proximal end of the pipe 111; a stopper spring 113, a piston 114, and a plurality of balls 115 which are arranged inside the pipe 111; a guide block 116 fitted in the other end (distal end) of the pipe 111.

In the seat belt retractor, the ring gear 118 is held to the pretensioner cover 109 by the pins 47 before the activation of the pretensioner 100. In this state, the ring gear 118 and the pinion 120 are out of mesh and have a predetermined clearance therebetween. Therefore, the spool 102 can freely rotate. When the gas generator 112 is activated to generate gas, the piston 114 and the plurality of balls 115 within the pipe 111 of the pretensioner 100 are pushed by the pressure of gas. As a result, the pins 117 are sheared by pressing force of the balls 115, whereby the holding of the ring gear 118 is released and internal teeth 118b of the ring gear 118 and external teeth 120a of the pinion 120 are meshed with each other, that is, the coupled state of the clutch mechanism. As the external teeth 118a of the ring gear 118 are forced by the balls 115 so as to rotate the ring gear 118, the spool 102 is rotated via the pinion 120 coupled with the ring gear 118. In this manner, the belt S is pretensioned.

As shown in FIG. 7, a shaft portion 122 of the spool 102 is inserted into and thus held by a hole 110a of the pretensioner plate 110 of the pretensioner 100. Since the shaft portion 122 of the spool 102 is directly held by the pretensioner plate 11. The spool 102 is forced against the pretensioner plate 110 due to the impact produced when the ring gear 118 and the pinion 120 mesh together (coupled with each other). As a result, the shaft portion 122 of the spool 102 may be deformed because the spool 102 is made of aluminum while the pretensioner plate 110 is made of steel. The power transmitting function of the pretensioner 100 may be reduced due to the deformation of the spool 102.

Figure 1:
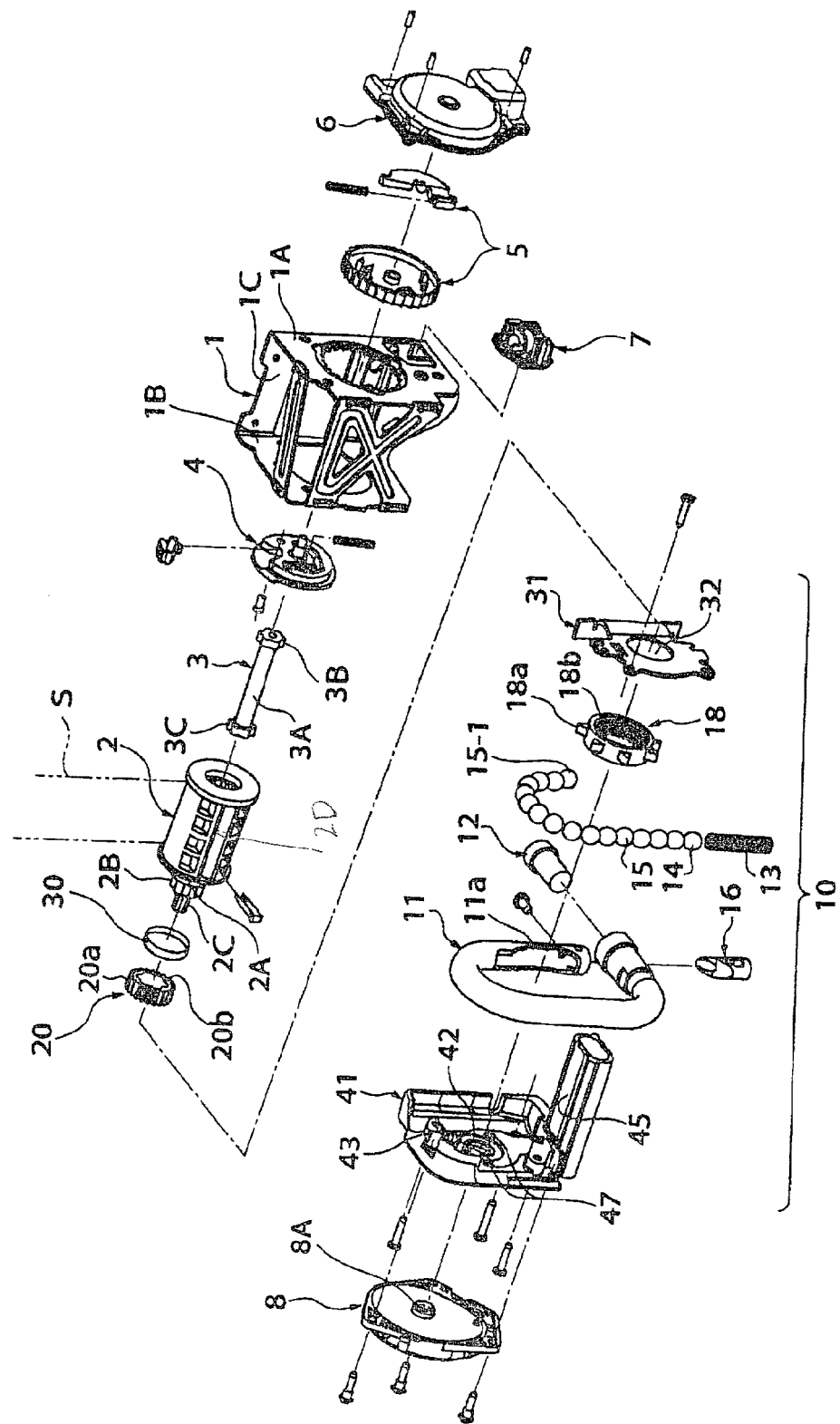
FIG. 1 is an exploded perspective view showing a seat belt retractor according to an embodiment of the present invention.
Figure 2:
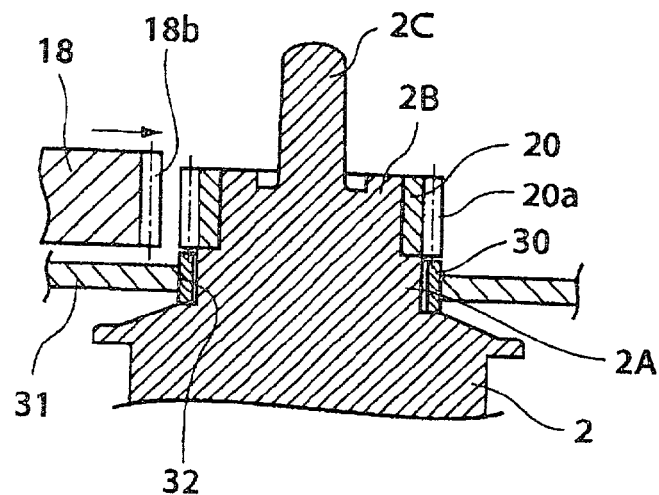
FIG. 2(A) is a sectional view, taken along the axis of a spool, showing a clutch mechanism portion of the seat belt retractor of FIG. 1
FIG. 2(B) is a sectional view taken along in the radial direction of the shaft portion of the spool.
Figure 2:
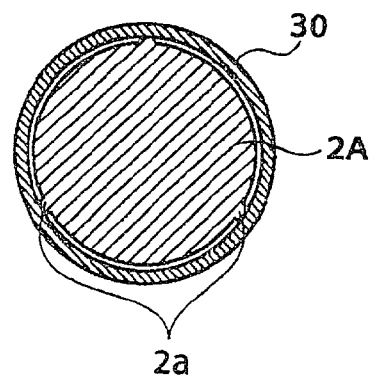

As shown in FIG. 2A the present invention is characterized by a spool bearing 30 interposed between a spool 2 for winding a belt S thereon and a pretensioner plate 31 of a pretensioner 10. In addition, as shown in FIG. 1, the basic structure of the seat belt retractor includes the following components: a base 1; the spool 2 for winding the belt S thereon; a torsion bar 3 fixed to the spool 2 to extend along the axis of the spool 2; locking mechanisms 4, 5 for preventing the rotation of the spool 2 in the belt withdrawing direction during the emergency locking operation; and a retainer 6 for supporting one end 3B of the torsion bar 3 via the locking mechanisms 4, 5; a deceleration detecting device 7 for detecting deceleration of a vehicle; a pretensioner 10 for rapidly rotating the spool 2 in the belt-winding direction in the event of a vehicle collision; and a clutch mechanism additionally provided for the pretensioner 10; and a return spring 8 for biasing the spool 2 in the belt-winding direction.

Hereinafter, description will be made as regard to the structure of the seat belt retractor according to the embodiment of the present invention.

As shown in FIG. 1, the base or frame 1 comprises a pair of side walls 1A, 1B arranged in parallel, and a back plate 1C connecting the side walls 1A, 1B. The base 1 is, for example, a press product made of a steel plate. The spool 102 on which the belt S is wound is disposed between the both side alls 1A and 1B of the base 1. Further disposed on the side wall 1A is the deceleration detecting device 7.

As shown in FIG. 1, the spool 2 has a drum-like shape. A shaft portion 2A, a spool gear 2B, and a spring-biased shaft projection 2C are disposed to project from the left end face (the left side in FIG. 1) of the spool 2. As best seen in FIG. 2(A), a spool bearing (or ring-like collar) 30 is fitted around the shaft portion 2A of the spool 2. The spool bearing 30 is made of a material having high hardness and high rigidity such as SUS or SC. Also, the bearing may be made of SPCC or SPHC. The above materials are commonly referred to as follows: SUS—stainless steels; SC—carbon steels for machine structural use; SPCC—cold rolled plates; and SPHC—hot rolled plates. The surface of the spool bearing 30 may be covered with a low friction coating.

As shown in FIG. 2(B), ribs 2a are formed at three locations around the outer periphery of the shaft portion 2A of the spool 2. The ribs 2a are in contact with the inner surface of the spool bearing 30. Therefore, the spool bearing 30 and the spool 2 are strongly coupled to each other just like one unit, thereby preventing the backlash of the spool 2 during the normal operation (during rotation for withdrawing or winding up the belt S). The spool bearing 30 prevents the spool 2 from being directly subjected to load.

The spool gear 2B of the spool 2 projects outside from the side wall 1B of the base 1. As shown in FIG. 2(A), a pinion 20 composing a clutch mechanism inside the pretensioner 10 is fitted around the spool gear 2B. The spring-biased shaft projection 2C is inserted into a bush hole 8A (see FIG. 1) of a cover of the return spring 8. The return spring 8 applies a biasing force onto the spring-biased shaft projection 2C. The spool 2 is also provided with a hole 2D extending in the axial direction thereof as shown in FIG. 1. The torsion bar 3 is arranged inside the hole 2D.

As shown in FIG. 1, the torsion bar 3 comprises a bar portion 3A and hexagonal ends 3B, 3C on the both ends of the bar portion 3A. In the assembled state, one of the hexagonal ends 3B (the right end in FIG. 1) is fitted and fixed to a central portion of the back surface (a hidden surface in FIG. 1) of the locking mechanism 4. The other hexagonal end 3C is fitted and fixed to a portion inside the spool gear 2B of the spool 2. The torsion bar 3 is twisted for limiting the belt load in the event of a vehicle collision, providing Energy Absorption (EA).

The locking mechanisms 4, 5 and the retainer 6 shown in FIG. 1 are arranged on the side wall 1A side of the base 1 when the seat belt retractor is assembled. The deceleration detecting device 7 shown in FIG. 1 is mounted on the side wall 1A of the base 1.

Figure 4:
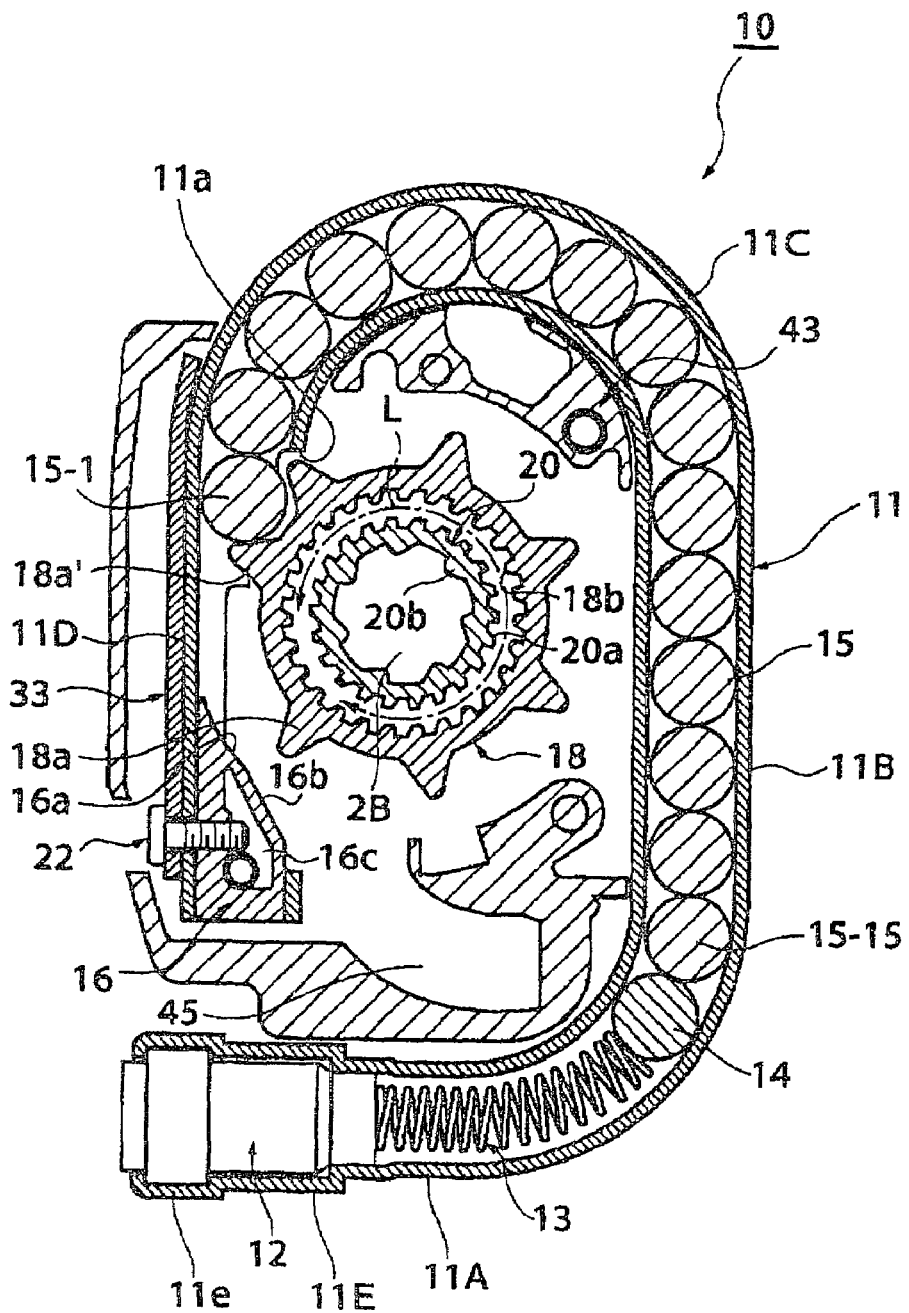
FIG. 4 is a frontal sectional view of a pretensioner of the seat belt retractor according to the embodiment of the present invention, showing the state before the activation.
Figure 5:
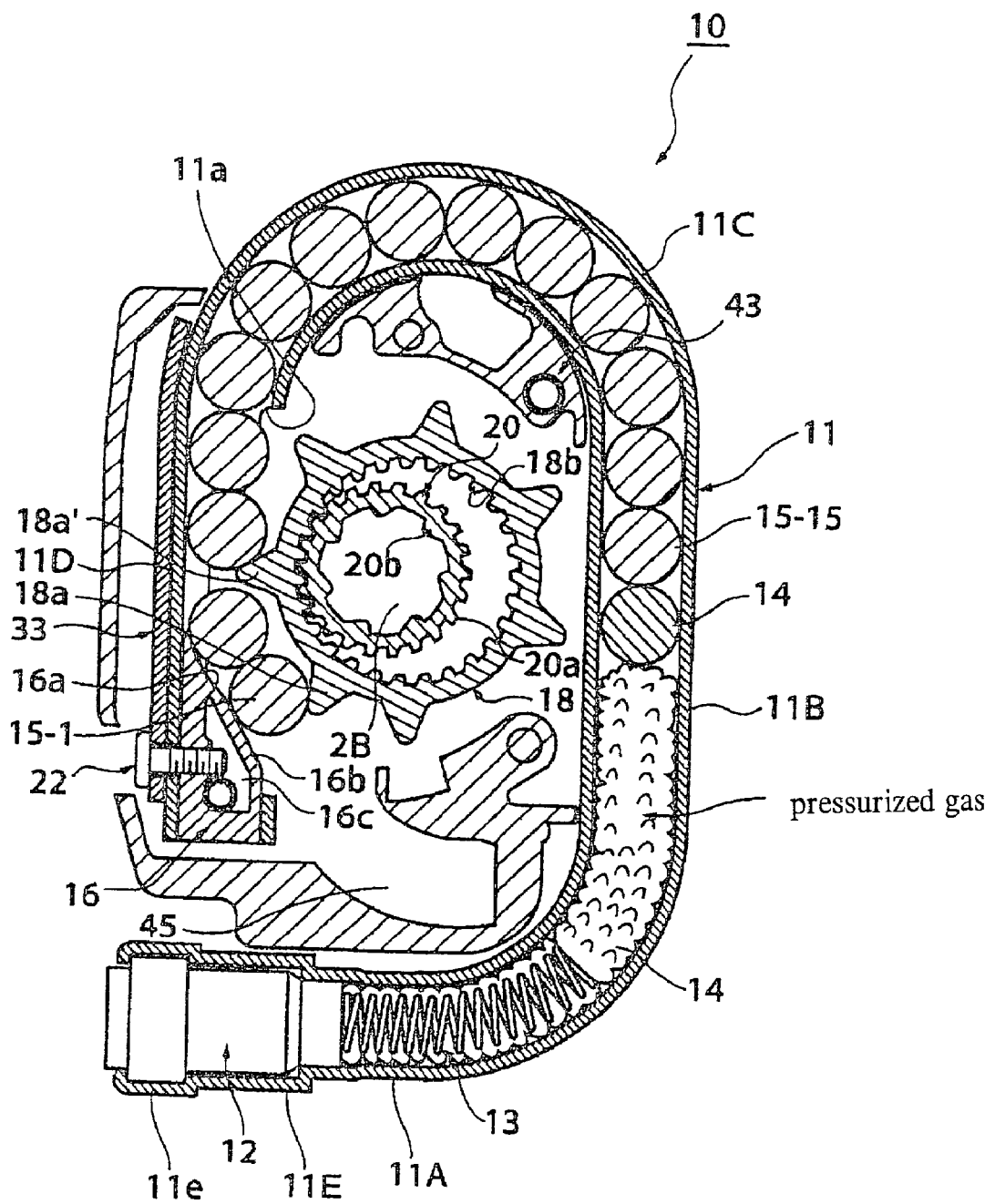
FIG. 5 is a frontal sectional view of the pretensioner, showing the state just after the activation.

The pretensioner 10 will now be described with reference mainly to FIG. 1, FIG. 4, and FIG. 5. The pretensioner 10 comprises a pipe 11. The pipe 11 is interposed between the pretensioner cover 41 and the pretensioner plate 31 and, in this state, is attached to the outside of a side wall of the base 1. The pipe 11 is a curved steel pipe which may, for example, be bent into the desired shape. As best seen in FIG. 4 and FIG. 5, the pipe 11 continuously extends from the proximal end 11A at the bottom side in the drawings to a straight portion 11B. The portion between the proximal end 11A and the straight portion 11B is bent at approximately 90° from the proximal end 11A toward the upper right. The pipe 11 further continuously extends from the straight portion 11B to a semi-circular portion 11C at the top side in the drawings. The pipe 11 further extends downwardly from the semi-circular portion 11C to a straight portion 11D. Formed in the straight portion 11D is a cut-out 11a facing an area surrounded by the pipe 11. One or more of external teeth 18a of the ring gear 18, described later, are partially positioned inside the cut-out 11a.

The ring gear 18 is arranged in the area surrounded by the pipe 11 (this area will be referred to as "the inner area of the pipe 11"). The ring gear 18 is held at a predetermined position in the inner area of the pipe 11 by two pins 42 of the pretensioner cover 41. Also arranged inside the ring gear 18 is the pinion 20. The pinion 20 has external teeth 20a formed around the outer periphery thereof and internal teeth 20b formed around the inner periphery thereof. The pinion 20 is fixedly fitted around the spool gear 2B of the spool 2 (see FIG. 2(A)).

Formed around the inner periphery of the ring gear 18 are inner teeth 18b capable of meshing with the external teeth 20a of the pinion 20. The inner diameter of the ring gear 18 is larger than the outer diameter of the pinion 20. As a result, a clearance is ensured between the internal teeth 18b of the ring gear 18 and the external teeth 20a of the pinion 20 so that the ring gear 18 and the pinion 20 are out of mesh in the state shown in FIG. 4. Therefore, the spool 2 can freely rotate, in spite of the existence of the pretensioner 10. This state means the decoupled state of a clutch mechanism composed of the ring gear 18 and the pinion 20.

The ring gear 18 has a plurality of external teeth 18a (i.e., driving points or levers) formed around the outer periphery thereof. The external teeth 18a project outwardly just like projections (the number of the teeth is seven in the illustrated example). The respective external teeth are generally spaced. However, one tooth marked by numeral 18a' is offset. The offset tooth 18a' is positioned inside the cut-off 11a of the straight portion 11D of the pipe 11 and is in contact with the front-most ball 15-1 (described later) in the pipe 11.

Formed at the proximal end 11A of the pipe 11 is a generator-housing portion 11E of which diameter is slightly larger than that of the pipe 11. A gas generator 12 is housed in the generator-housing portion 11E. The gas generator 12 ignites explosive therein according to a signal outputted from a collision detecting means (not shown) in the event of an accident such as a vehicle collision so as to supply gas pressure into the pipe 11. The gas generator 12 is fixed by a crimped flange portion 11e after being inserted in the generator-housing portion 11E.

Arranged inside the pipe 11 are, in the order from the gas generator 12, a coil spring 13, a piston 14, and a plurality of balls 15 (fifteen balls are shown in the illustrated example) positioned in series. Each ball 15 (i.e., driving member) is a sphere made of metal such as steel. Each ball 15 may be surfaced with low frictional coating. The outer diameter of the ball 15 is slightly smaller than the inner diameter of the pipe 11, thus allowing relative smooth movement of the balls inside the pipe 11. The front-most ball 15-1 is in contact with the external tooth 18a' of the ring gear 18.

The piston 14 is made of resin such as silicone rubber. The piston 14 is deformed to increase its diameter after the discharge of gas so that the piston 14 comes in close contact with the inner surface of the pipe 11, thereby achieving sealing function for preventing gas from leaking to the distal end (the other end) side.

The coil spring 13 is disposed between the gas generator 12 and the piston 14 to bias the piston 14 in a direction toward the distal end. Because of the biasing force of the coil spring 13, the front-most ball 15-1 is in contact with the external tooth 18a' of the ring gear 18.

A guide block 16 is attached to the end of the straight portion 11D of the pipe 11 by a vis or fastener 22. The guide block 16 is a cylindrical member having a slant end face which is formed by obliquely cutting. This slant end face functions as a guide face. The guide face comprises a first guide face 16a and a second guide face 16b. The first guide face 16a is formed at the top end of the guide block into an arc shape substantially concentrical with the ring gear 18. During the actuation of the pretensioner, balls 15 are forced out of the pipe 11 and then collide with the first guide face 16a. The second guide face 16b is a flat face which extends in such a way as to gradually increase the distance from the ring gear 18. The vis 22 also has the function of fixing the pipe 11 to the pretensioner plate 31

The guide block 16 has a through opening 16c which extends from one side to the opposite side along the width direction of the guide face. The through opening 16c is formed in a portion substantially beneath the second guide face 16b. Because of this through opening 16c, most of the second guide face 16b is a thin plate so that the second guide face 16b has poor rigidity. The first guide face 16a has high rigidity because it is supported by the side walls of the guide block 16 itself.

As shown in FIG. 1, the pretensioner plate 31 is interposed between the pipe 11 and the outside of the side wall 1B of the base 1. The pretensioner plate 31 is provided with a through hole 32 at substantially the center thereof. As shown in FIG. 2(A), the shaft portion 2A of the spool 2 around which the spool bearing 30 is fitted is positioned inside the through hole 32.

The peripheral edge of the through hole 32 of the pretensioner plate 31 may be formed to have a wider area as shown in FIGS. 3(A)–3(D). Therefore, the contact area between the peripheral edge of the through hole 32 of the pretensioner plate 31 and the outer periphery of the spool bearing 30 can be increased, thereby reducing the bearing stress.

Figure 3:
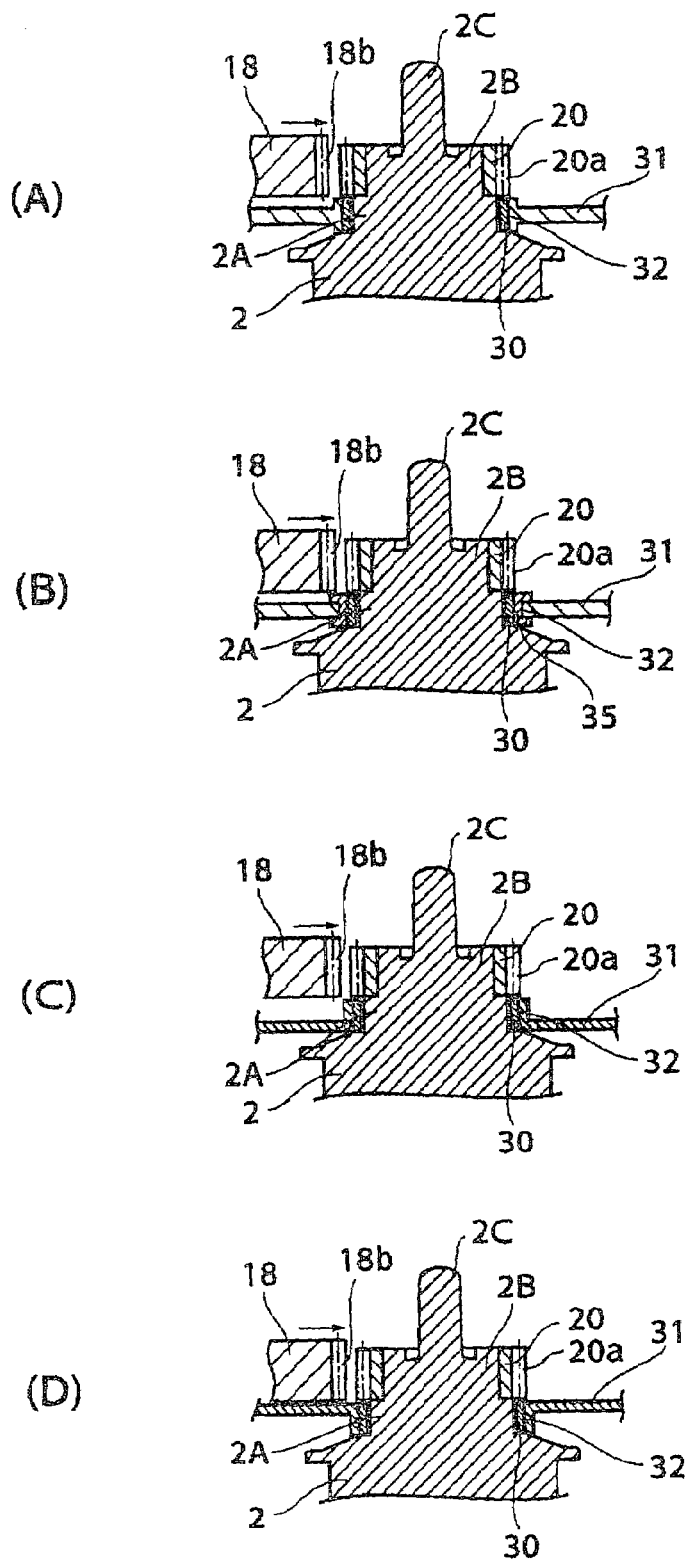
FIGS. 3(A)–3(D) are sectional views each showing a variation of the clutch mechanism portion of the seat belt retractor.

FIG. 3(A) is a sectional view showing an example in which the peripheral edge of the through hole 32 of the pretensioner plate 31 is formed to have a T-shaped section.

FIG. 3(B) is a sectional view showing an example in which the peripheral edge of the through hole 32 of the pretensioner plate 31 is covered by a ring member 35 having a channel-shaped section which is made of metal (preferably iron). It should be noted that the ring member 35 may extend radially outward a distance indicated by a mark L in FIG. 4 (where force is exerted during the activation of the pretensioner), and may extend axially along the whole periphery of the through hole 32. This configuration facilitates assembly of the ring member 35 to the through hole 32.

FIG. 3(C) is a sectional view showing an example in which the peripheral edge of the through hole 32 of the pretensioner plate 31 is bent toward the ring gear 18. FIG. 3(D) is a sectional view showing an example in which the peripheral edge of the through hole 32 of the pretensioner plate 31 is bent in a direction opposite to that in FIG. 3(C).

The pretensioner cover 41 shown in FIG. 1 is an aluminum product made of die casting and is provided with a through hole 42 formed at substantially the center thereof. The spring-biased shaft projection 2C of the spool 2 is inserted into the through hole 42. The pretensioner cover 41 has a pipe guide 43 formed on a pipe-side surface thereof. As shown in FIG. 4 and FIG. 5, the pipe guide 43 supports the inner area of the pipe 11 and guides the semi-circular portion 11C of the pipe 11. The pretensioner cover 41 further includes two pins 47 studded to the pipe-side surface thereof. The ring gear 18 is held in its predetermined position in the inner area of the pipe 11 by the two pins 47. The pretensioner cover 41 is provided with a ball receiving portion 45 formed on a lower part thereof. Balls 15 forced out of the pipe 11 are received and gathered in the ball receiving portion 45.

The return spring 8 shown in FIG. 1 is housed in a cover. The cover for the return spring 8 has a bush hole 8A formed at the center thereof. The spring-biased shaft projection 2C of the spool 2 is fitted in the bush hole 8A not to allow relative rotation because they are engaged with each other through splines. The spool 2 is always biased in the belt-winding direction by the return spring 8.

Hereinafter, the operation of the pretensioner 10 having the aforementioned structure will be described with regard to the characteristics of the present invention. When the pretensioner is not actuated (in the normal state), the ring gear 18 is held in its predetermined position in the inner area of the pipe 11 by the two pins 47 (see FIG. 1) of the pretensioner cover 41. In this state, the ring gear 18 is not meshed with the pinion 20 as shown in FIG. 4. Therefore, the spool 2 freely rotates regardless of the pretensioner 10.

As a vehicle collision is detected, a signal is transmitted to the gas generator 12. According to this signal, as shown in FIG. 5, the gas generator 12 is activated to supply gas pressure into the pipe 11. The piston 14 which is located nearest to the gas generator 12 is pushed by the gas pressure. The plurality of balls 15 are subsequently pushed by the pushing force of the piston 14. Thus, the force is transmitted to the front-most ball 15-1 (which is in contact with the external tooth 18a' of the ring gear 18). During this, the gas pressure deforms and increase the diameter of the piston 14 so that the piston 14 functions as seal relative to the inner surface of the pipe 11, thereby preventing gas from leaking to the distal end side.

The force transmitted through the balls 15 is exerted on the ring gear 18. As a result of this, the pins 47 (see FIG. 1) are sheared so as to release the ring gear 18. Therefore, the ring gear 18 moves to the pinion 20, causing the internal teeth 18b of the ring gear 18 to mesh with the external teeth 20a of the pinion 20. The ring gear 18 is rotated about the shaft of the pinion 20 by the force of the balls 15 pushing the external teeth 18a. Before the ring gear 18 starts to move, the front-most ball 15-1 is in contact with the external tooth 18a' of the ring gear 18 thereby applying torque to the external tooth 18a', to ensure the rotation of the ring gear 18.

While the ring gear 18 and the pinion 20 are meshed with each other, the ring gear 18 is pushed by the driving force of the balls 15, causing great impact to be exerted to the spool 2 side. The impact is transmitted to the spool 2 through the spool bearing 30. The impact is not directly exerted to the spool 2, thereby preventing the shaft portion 2A of the spool 2 from being deformed.

As the balls 15 are subsequently pushed out by the gas pressure, each ball 15 falls in corresponding one of the depressions formed between the external teeth 18a of the ring gear 18. As shown in FIG. 5, one depression of the ring gear 18 corresponds to and is engaged with two balls 15. The engagements of the balls 15 rotates the ring gear 18 in the counter-clockwise direction in FIG. 5. The external teeth 20a of the pinion and the internal teeth 18b of the ring gear 18 mesh together causing the rotation of the ring gear 18 to be transmitted to the pinion 20. As a result, the ring gear 18 and the pinion 20 move with each other. The pinion 20 is fitted to the spool gear 2B of the spool 2, causing the spool 2 to rotate with the pinion 20, thereby immediately taking up some length of the seat belt S (see FIG. 1) in the belt-winding direction. The balls 15 are forced out of the pipe 11 through the end opening 21b of the pipe 11 and are gathered into the ball receiving portion 45 of the pretensioner cover 41. As described above, the present invention can stabilize the performance of the pretensioner.

The priority application, Japanese Patent Application No. 2000-337391, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor comprising:
    a spool for winding up a seat belt rotatably held in a frame;
    a bearing attached to a portion of said spool held by said frame;
    a clutch mechanism arranged on one end of said spool;
    a pretensioner disposed adjacent to said clutch mechanism; and
    wherein said spool is made of light alloy, and said bearing is made of steel,
    wherein said pretensioner comprises:
        a gas generator;
        a plurality of serial driving members positioned to be accelerated by gas generated from said gas generator;
        a path for guiding said driving members;
        a first rotational member having a plurality of levers, wherein said driving members collide with said levers so as to apply rotational torque to said first rotatable member;
        a second rotational member fixed to said spool; and
        a clutch mechanism formed by said first rotational member and said second rotational member, wherein said second rotational member being a pinion having external teeth;

said first rotational member being a ring gear having internal teeth capable of meshed with the external teeth of said pinion and the levers around the outer periphery thereof;

said clutch mechanism becomes in its coupled state where the internal teeth of said ring gear are meshed with the external teeth of said pinion thereby allowing said accelerated driving members to push the levers of said ring gear so as to move said ring gear; and said clutch mechanism being in its decoupled state before the activation of pretensioner and switching into its coupled state by the rotation of said first rotational member when the pretensioner is activated.

2. A seat belt retractor comprising:

a rotatable spool for winding and unwinding a seat belt;

a pretensioner operably connected to the spool for rotating the spool to wind the seat belt;

wherein the pretensioner includes an opening for retaining the spool; and wherein a bearing is positioned in the opening between the pretensioner and the spool and the bearing comprises a material having a greater hardness than the spool, wherein said pretensioner comprises:

a gas generator;

a plurality of serial driving members positioned to be accelerated by gas generated from said gas generator;

a path for guiding said driving members;

a first rotational member having a plurality of levers, wherein said driving members collide with said levers so as to apply rotational torque to said first rotatable member;

a second rotational member fixed to said spool; and a clutch mechanism formed by said first rotational member and said second rotational member, wherein said second rotational member being a pinion having external said first rotational member being a ring gear having internal teeth capable of meshed with the external teeth of said pinion and the levers around the outer periphery thereof;

said clutch mechanism becomes in its coupled state where the internal teeth of said ring gear are meshed with the external teeth of said pinion thereby allowing said accelerated driving members to push the levers of said ring gear so as to move said ring gear; and said clutch mechanism being in its decoupled state before the activation of pretensioner and switching into its coupled state by the rotation of said first rotational member when the pretensioner is activated.

3. The retractor of claim 2, wherein the opening is formed in a plate of the pretensioner.

4. The retractor of claim 2, wherein the bearing comprises a collar.

5. The retractor of claim 2, wherein the spool includes a shaft that extends through the opening.

6. The retractor of claim 5, wherein the bearing is positioned between the shaft and the opening.

7. A seat belt system comprising:

a seat belt retractor;

a spool for winding up a seat belt rotatably held in a frame;

a bearing attached to a portion of said spool held by said frame;

a clutch mechanism arranged on one end of said spool; and a pretensioner disposed adjacent to said clutch mechanism, wherein said spool is made of light alloy, and said bearing is made of steel, and wherein said pretensioner comprises:

a gas generator;

a plurality of serial driving members positioned to be accelerated by gas generated from said gas generator;

a path for guiding said driving members;

a first rotational member having a plurality of levers, wherein said driving members collide with said levers so as to apply rotational torque to said first rotatable member;

a second rotational member fixed to said spool; and a clutch mechanism formed by said first rotational member and said second rotational member, wherein said second rotational member being a pinion having external teeth;

said first rotational member being a ring gear having internal teeth capable of meshed with the external teeth of said pinion and the levers around the outer periphery thereof;

said clutch mechanism becomes in its coupled state where the internal teeth of said ring gear are meshed with the external teeth of said pinion thereby allowing said accelerated driving members to push the levers of said ring gear so as to move said ring gear; and said clutch mechanism being in its decoupled state before the activation of pretensioner and switching into its coupled state by the rotation of said first rotational member when the pretensioner is activated.

8. A seat belt system comprising:

a seat belt retractor;

a rotatable spool for winding and unwinding a seat belt;

a pretensioner operably connected to the spool for rotating the spool to wind the seat belt;

wherein the pretensioner includes an opening for retaining the spool; and wherein a bearing is positioned in the opening between the pretensioner and the spool and the bearing comprises a material having a greater hardness than the spool, wherein said pretensioner comprises:

a gas generator;

a plurality of serial driving members positioned to be accelerated by gas generated from said gas generator;

a path for guiding said driving members;

a first rotational member having a plurality of levers, wherein said driving members collide with said levers so as to apply rotational torque to said first rotatable member;

a second rotational member fixed to said spool; and a clutch mechanism formed by said first rotational member and said second rotational member, wherein said second rotational member being a pinion having external teeth;

said first rotational member being a ring gear having internal teeth capable of meshed with the external teeth of said pinion and the levers around the outer periphery thereof;

said clutch mechanism becomes in its coupled state where the internal teeth of said ring gear are meshed with the external teeth of said pinion thereby allowing said accelerated driving members to push the levers of said ring gear so as to move said ring gear; and said clutch mechanism being in its decoupled state before the activation of pretensioner and switching into its coupled state by the rotation of said first rotational member when the pretensioner is activated.

9. The system of claim 8, wherein the opening is formed in a plate of the pretensioner.

10. The system of claim 8, wherein the bearing comprises a collar.

11. The system of claim 8, wherein the spool includes a shaft that extends through the opening.

12. The system of claim 11, wherein the bearing is positioned between the shaft and the opening.

* * * * *